(12) United States Patent
Sukhija et al.

(10) Patent No.: US 12,112,320 B2
(45) Date of Patent: *Oct. 8, 2024

(54) METHOD AND SYSTEM OF AUTHENTICATING A PAYMENT TRANSACTION USING A USER DEVICE

(71) Applicant: Visa International Service Association, San Francisco, CA (US)

(72) Inventors: Rohit Sukhija, Bangalore (IN); Pragathi M S, Bangalore (IN); Hemanth Kumar Manoharan, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,057

(22) Filed: Oct. 5, 2023

(65) Prior Publication Data

US 2024/0029060 A1 Jan. 25, 2024

Related U.S. Application Data

(63) Continuation of application No. 17/136,425, filed on Dec. 29, 2020, now Pat. No. 11,797,983.

(51) Int. Cl.
*G06Q 20/38* (2012.01)
*G06Q 20/32* (2012.01)

(52) U.S. Cl.
CPC ..... *G06Q 20/3821* (2013.01); *G06Q 20/3226* (2013.01); *G06Q 20/3229* (2013.01); *G06Q 20/3829* (2013.01)

(58) Field of Classification Search
None
See application file for complete search history.

(56) References Cited

U.S. PATENT DOCUMENTS

| 2012/0289188 A1 | 11/2012 | Marcus et al. |
| 2016/0019536 A1 | 1/2016 | Ortiz et al. |
| 2016/0379208 A1 | 12/2016 | Deliwala et al. |

(Continued)

FOREIGN PATENT DOCUMENTS

| CN | 104284309 B | 11/2017 |
| WO | 2016209372 A1 | 12/2016 |

*Primary Examiner* — Matthew S Gart
*Assistant Examiner* — Amit Patel
(74) *Attorney, Agent, or Firm* — The Webb Law Firm

(57) ABSTRACT

A method and system for authenticating a payment transaction. The method includes receiving a request for verifying a phone number associated with a Subscriber Identification Module card from a merchant application installed in the user device. Further, obtaining a first key from at least one of a server associated with a manufacturer of the user device and a network server. Furthermore, generating a first cryptogram based on at least one of the phone number and a unique identification value associated with the user device using the first key, wherein the first cryptogram is provided to the server associated with the manufacturer for verification. Upon verification of the first cryptogram, the method includes receiving a second cryptogram from the server associated with the manufacturer, wherein the merchant application provides the second cryptogram and payment transaction details to an issuer server for authentication of the payment transaction.

20 Claims, 9 Drawing Sheets

(56) References Cited

U.S. PATENT DOCUMENTS

| | | |
|---|---|---|
| 2018/0114221 A1 | 4/2018 | Karantzis |
| 2020/0151717 A1 | 5/2020 | de Oliveira et al. |
| 2020/0329014 A1 | 10/2020 | Chen |
| 2022/0131870 A1* | 4/2022 | McKinnon ............ H04L 9/3226 |

* cited by examiner

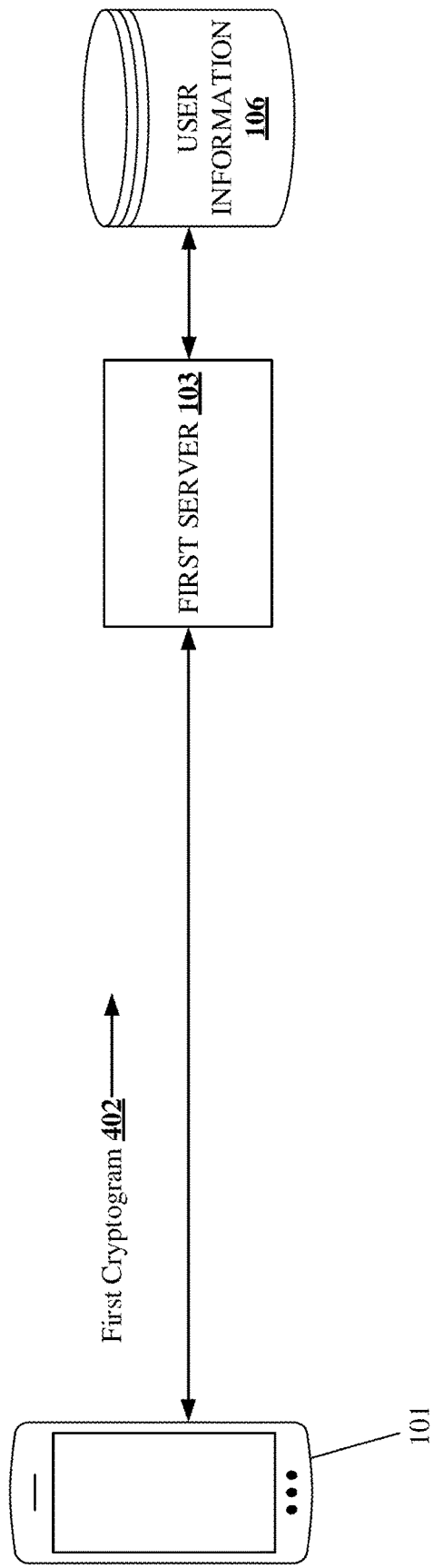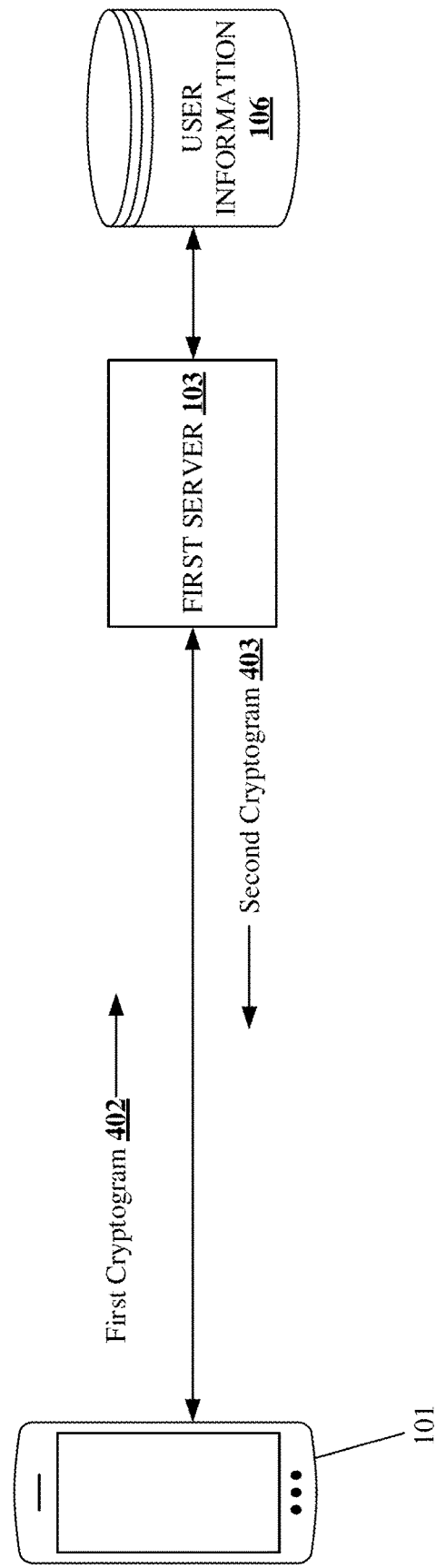

METHOD AND SYSTEM OF AUTHENTICATING A PAYMENT TRANSACTION USING A USER DEVICE

CROSS REFERENCE TO RELATED APPLICATION

This application is a continuation of U.S. patent application Ser. No. 17/136,425, filed Dec. 29, 2020, the disclosure of which is hereby incorporated by reference in its entirety.

BACKGROUND

1. Technical Field

The present disclosure relates to an authentication of a payment transaction. Particularly, but not exclusively, the present disclosure relates to a method and system of authenticating a payment transaction using a user device.

2. Technical Considerations

In today's environment, a two-factor authentication or a two-step verification is often used as a security process to verify the user performing a payment transaction. The two-factor authentication protects the user's credentials and the resources the user can access. Further, the two-factor authentication provides an improved level of security over authentication methods that depend on single-factor authentication (SFA) in which the user provides only one factor such as a password or passcode. The two-factor authentication methods rely on the user for providing a password, as well as a second factor, such as a unique one-time passcode (OTP) via text message, push notifications, a software-generated time-based, one-time passcode (e.g., TOTP), biometric authentication, and the like. Further, the text message based OTP is the preferred two-factor authentication to verify the user corresponding to the payment transaction by verifying the mobile number associated with the user device using the OTP.

Further, the existing text message based two-factor authentication process reduces the payment success rate and the overall payment transaction time due to various reasons including network failure and delay in receiving the OTP in the text message from the issuer via the service provider of the cellular network for the user device. Further, the failure rate of the payment transaction increases, and the customer satisfaction decreases due to a failure in receiving the OTP within a predefined time interval from the issuer.

The information disclosed in this background of the disclosure section is only for enhancement of understanding of the general background of the present disclosure and should not be taken as an acknowledgment or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method, comprising: receiving, by at least one processor of a user device, a request for verifying a phone number associated with a Subscriber Identification Module (SIM) card in the user device from a merchant application installed in the user device, wherein the request for verifying the phone number is received upon initiating a payment transaction in the user device; in response to receiving the request, obtaining, by the at least one processor, a first key from at least one of a server associated with a manufacturer of the user device and a network server; generating, by the at least one processor, a first cryptogram based on at least one of the phone number and a unique identification value associated with the user device using the first key, wherein the first cryptogram is provided to the server associated with the manufacturer for verification; and upon verification of the first cryptogram, receiving, by the at least one processor, a second cryptogram from the server associated with the manufacturer, wherein the merchant application provides the second cryptogram and payment transaction details to an issuer server for authentication of the payment transaction.

In some non-limiting embodiments or aspects, obtaining the first key from the server associated with the manufacturer of the user device comprises: sending a request for the first key to the server associated with the manufacturer of the user device; and one of: (i) receiving the first key from the server associated with the manufacturer, wherein the server associated with the manufacturer generates the first key in real-time using one or more cryptographic techniques; and (ii) fetching the first key from a memory associated with the user device, wherein the first key was generated by the server associated with the manufacturer and stored in the memory associated with the user device during manufacturing of the user device.

In some non-limiting embodiments or aspects, obtaining the first key from the network server comprises: sending a request for the first key to the network server via the server associated with the manufacturer of the user device; and receiving the first key from the network server via the server associated with the manufacturer of the user device, wherein the network server generates the first key in real-time using one or more cryptographic techniques.

In some non-limiting embodiments or aspects, generating the first cryptogram is based on one or more encryption techniques using at least one of the phone number and the unique identification value associated with the user device and the first key. In some non-limiting embodiments or aspects, providing the first cryptogram to the server associated with the manufacturer triggers the server associated with the manufacturer to decrypt the first cryptogram using the first key and one or more decryption techniques corresponding to one or more encryption techniques used to generate the first cryptogram and to validate the phone number and the unique identification value associated with the user device based on user information stored in a database corresponding to the server associated with the manufacturer of the user device.

In some non-limiting embodiments or aspects, the second cryptogram received by the at least one processor from the server associated with the manufacturer is generated by the server associated with the manufacturer using a second key based on the at least one of the phone number and the unique identification value associated with the user device, wherein the second key is obtained from the network server. In some non-limiting embodiments or aspects, providing the second cryptogram and the payment transaction details to the issuer server comprises sending the second cryptogram and the payment transaction details to the issuer server via at least one of the following: the network server, a direct integration with the issuer server, an Access Control Server (ACS), a Merchant Plug-In (MPI) provider, or any combination thereof.

In some non-limiting embodiments or aspects, the method further comprises: receiving an authentication response from the issuer server after authentication of the payment transaction, wherein the authentication of the payment transaction comprises: decrypting, by the issuer server, the second cryptogram using a second key, wherein the second key is obtained from the network server; validating, by the issuer server, the phone number associated with the user device based on a payer information stored in a database associated with the issuer server; and providing, by the issuer server, the authentication response to the user device based on a result of the validation. In some non-limiting embodiments or aspects, the unique identification value comprises at least an International Mobile Equipment Identity (IMEI) number associated with the user device.

In some non-limiting embodiments or aspects, provided is a user device for authenticating a payment transaction, comprising: at least one processor; and a memory communicatively coupled to the at least one processor, wherein the memory stores processor instructions, which, on execution, causes the at least one processor to: receive a request for verifying a phone number associated with a Subscriber Identification Module (SIM) card in the user device from a merchant application installed in the user device, wherein the request for verifying the phone number is received upon initiating a payment transaction in the user device; in response to receiving the request, obtain a first key from at least one of a server associated with a manufacturer of the user device and a network server; generate a first cryptogram based on at least one of the phone number and a unique identification value associated with the user device using the first key, wherein the first cryptogram is provided to the server associated with the manufacturer for verification; and upon verification of the first cryptogram, receive a second cryptogram from the server associated with the manufacturer, wherein the merchant application provides the second cryptogram and payment transaction details to an issuer server for authentication of the payment transaction.

In some non-limiting embodiments or aspects, the at least one processor, configured to obtain the first key from the server associated with the manufacturer of the user device, comprises: sending a request for the first key to the server associated with the manufacturer of the user device; and one of: (i) receiving the first key from the server associated with the manufacturer, wherein the server associated with the manufacturer generates the first key in real-time using one or more cryptographic techniques; and (ii) fetching the first key from the memory associated with the user device, wherein the first key was generated by the server associated with the manufacturer and stored in the memory associated with the user device.

In some non-limiting embodiments or aspects, the at least one processor, configured to obtain the first key from the network server, comprises: sending a request for the first key to the network server via the server associated with the manufacturer of the user device; and receiving the first key from the network server via the server associated with the manufacturer of the user device, wherein the network server generates the first key in real-time using one or more cryptographic techniques. In some non-limiting embodiments or aspects, the at least one processor is configured to generate the first cryptogram based on one or more encryption techniques using at least one of the phone number and the unique identification value associated with the user device and the first key.

In some non-limiting embodiments or aspects, the at least one processor is configured to provide the first cryptogram to the server associated with the manufacturer for triggering the server associated with the manufacturer to decrypt the first cryptogram using the first key and one or more decryption techniques corresponding to one or more encryption techniques used to generate the first cryptogram and to validate the phone number and the unique identification value associated with the user device based on user information stored in a database corresponding to the server associated with the manufacturer of the user device. In some non-limiting embodiments or aspects, the at least one processor is configured to receive the second cryptogram generated by the server associated with the manufacturer using a second key based on the at least one of the phone number and the unique identification value associated with the user device, wherein the second key is obtained from the network server. In some non-limiting embodiments or aspects, the at least one processor, further configured to provide the second cryptogram and the payment transaction details to the issuer server, comprises sending the second cryptogram and the payment transaction details to the issuer server via at least one of the following: the network server, a direct integration with the issuer server, Access Control Server (ACS), a Merchant Plug-In (MPI) provider, or any combination thereof.

In some non-limiting embodiments or aspects, the at least one processor is further configured to: receive an authentication response from the issuer server after authentication of the payment transaction, wherein the authentication of the payment transaction comprises: decrypting, by the issuer server, the second cryptogram using a second key, wherein the second key is obtained from the network server; validating, by the issuer server, the phone number associated with the user device based on payer information stored in a database associated with the issuer server; and providing, by the issuer server, the authentication response to the user device based on a result of the validation.

In some non-limiting embodiments or aspects, provided is a network server, comprising: at least one processor; and a memory communicatively coupled to the at least one processor, wherein the memory stores processor instructions, which, on execution, causes the at least one processor to: receive a request for a first key from at least one of a user device and a server associated with a manufacturer of the user device; provide the first key to at least one of the user device and the server associated with the manufacturer, wherein the user device generates a first cryptogram based on at least one of a phone number associated with a Subscriber Identification Module (SIM) card in the user device and a unique identification value associated with the user device using the first key; receive a request for a second key from the server associated with the manufacturer; and provide the second key to the server associated with the manufacturer and an issuer server, wherein the server associated with the manufacturer generates a second cryptogram using the second key, further wherein the second cryptogram is validated to authenticate a payment transaction.

In some non-limiting embodiments or aspects, providing the first key comprises: generating the first key in real-time using one or more cryptographic techniques; and sending the first key to at least one of the user device and the server associated with the manufacturer. In some non-limiting embodiments or aspects, providing the second key comprises: generating the second key in real-time using one or more cryptographic techniques; and sending the second key to the server associated with the manufacturer and the issuer server.

Further non-limiting embodiments or aspects are set forth in the following numbered clauses:

Clause 1: A computer-implemented method, comprising: receiving, by at least one processor of a user device, a request for verifying a phone number associated with a Subscriber Identification Module (SIM) card in the user device from a merchant application installed in the user device, wherein the request for verifying the phone number is received upon initiating a payment transaction in the user device; in response to receiving the request, obtaining, by the at least one processor, a first key from at least one of a server associated with a manufacturer of the user device and a network server; generating, by the at least one processor, a first cryptogram based on at least one of the phone number and a unique identification value associated with the user device using the first key, wherein the first cryptogram is provided to the server associated with the manufacturer for verification; and upon verification of the first cryptogram, receiving, by the at least one processor, a second cryptogram from the server associated with the manufacturer, wherein the merchant application provides the second cryptogram and payment transaction details to an issuer server for authentication of the payment transaction.

Clause 2: The method of clause 1, wherein obtaining the first key from the server associated with the manufacturer of the user device comprises: sending a request for the first key to the server associated with the manufacturer of the user device; and one of: (i) receiving the first key from the server associated with the manufacturer, wherein the server associated with the manufacturer generates the first key in real-time using one or more cryptographic techniques; and (ii) fetching the first key from a memory associated with the user device, wherein the first key was generated by the server associated with the manufacturer and stored in the memory associated with the user device during manufacturing of the user device.

Clause 3: The method of clause 1 or 2, wherein obtaining the first key from the network server comprises: sending a request for the first key to the network server via the server associated with the manufacturer of the user device; and receiving the first key from the network server via the server associated with the manufacturer of the user device, wherein the network server generates the first key in real-time using one or more cryptographic techniques.

Clause 4: The method of any of clauses 1-3, wherein generating the first cryptogram is based on one or more encryption techniques using at least one of the phone number and the unique identification value associated with the user device and the first key.

Clause 5: The method of any of clauses 1-4, wherein providing the first cryptogram to the server associated with the manufacturer triggers the server associated with the manufacturer to decrypt the first cryptogram using the first key and one or more decryption techniques corresponding to one or more encryption techniques used to generate the first cryptogram and to validate the phone number and the unique identification value associated with the user device based on user information stored in a database corresponding to the server associated with the manufacturer of the user device.

Clause 6: The method of any of clauses 1-5, wherein the second cryptogram received by the at least one processor from the server associated with the manufacturer is generated by the server associated with the manufacturer using a second key based on at least one of the phone number and the unique identification value associated with the user device, wherein the second key is obtained from the network server.

Clause 7: The method of any of clauses 1-6, wherein providing the second cryptogram and the payment transaction details to the issuer server comprises sending the second cryptogram and the payment transaction details to the issuer server via at least one of the following: the network server, a direct integration with the issuer server, an Access Control Server (ACS), a Merchant Plug-In (MPI) provider, or any combination thereof.

Clause 8: The method of any of clauses 1-7, further comprising: receiving an authentication response from the issuer server after authentication of the payment transaction, wherein the authentication of the payment transaction comprises: decrypting, by the issuer server, the second cryptogram using a second key, wherein the second key is obtained from the network server; validating, by the issuer server, the phone number associated with the user device based on payer information stored in a database associated with the issuer server; and providing, by the issuer server, the authentication response to the user device based on a result of the validation.

Clause 9: The method of any of clauses 1-8, wherein the unique identification value comprises at least an International Mobile Equipment Identity (IMEI) number associated with the user device.

Clause 10: A user device for authenticating a payment transaction, comprising: at least one processor; and a memory communicatively coupled to the at least one processor, wherein the memory stores processor instructions, which, on execution, causes the at least one processor to: receive a request for verifying a phone number associated with a Subscriber Identification Module (SIM) card in the user device from a merchant application installed in the user device, wherein the request for verifying the phone number is received upon initiating a payment transaction in the user device; in response to receiving the request, obtain a first key from at least one of a server associated with a manufacturer of the user device and a network server; generate a first cryptogram based on at least one of the phone number and a unique identification value associated with the user device using the first key, wherein the first cryptogram is provided to the server associated with the manufacturer for verification; and upon verification of the first cryptogram, receive a second cryptogram from the server associated with the manufacturer, wherein the merchant application provides the second cryptogram and a payment transaction details to an issuer server for authentication of the payment transaction.

Clause 11: The user device of clause 10, wherein the at least one processor is configured to obtain the first key from the server associated with the manufacturer of the user device comprises: sending a request for the first key to the server associated with the manufacturer of the user device; and one of: (i) receiving the first key from the server associated with the manufacturer, wherein the server associated with the manufacturer generates the first key in real-time using one or more cryptographic techniques; and (ii) fetching the first key from the memory associated with the user device, wherein the first key was generated by the server associated with the manufacturer and stored in the memory associated with the user device.

Clause 12: The user device of clause 10 or 11, wherein the at least one processor is configured to obtain the first key from the network server comprises: sending a request for the first key to the network server via the server associated with the manufacturer of the user device; and receiving the first key from the network server via the server associated with the manufacturer of the user device, wherein the network server generates the first key in real-time using one or more cryptographic techniques.

Clause 13: The user device of any of clauses 10-12, wherein the at least one processor is configured to generate the first cryptogram based on one or more encryption techniques using at least one of the phone number and the unique identification value associated with the user device and the first key.

Clause 14: The user device of any of clauses 10-13, wherein the at least one processor is configured to provide the first cryptogram to the server associated with the manufacturer for triggering the server associated with the manufacturer to decrypt the first cryptogram using the first key and one or more decryption techniques corresponding to one or more encryption techniques used to generate the first cryptogram and to validate the phone number and the unique identification value associated with the user device based on a user information stored in a database corresponding to the server associated with the manufacturer of the user device.

Clause 15: The user device of any of clauses 10-14, wherein the at least one processor is configured to receive the second cryptogram generated by the server associated with the manufacturer using a second key based on at least one of the phone number and the unique identification value associated with the user device, wherein the second key is obtained from the network server.

Clause 16: The user device of any of clauses 10-15, wherein the at least one processor is further configured to provide the second cryptogram and the payment transaction details to the issuer server comprises sending the second cryptogram and the payment transaction details to the issuer server via at least one of the following: the network server, a direct integration with the issuer server, Access Control Server (ACS), a Merchant Plug-In (MPI) provider, or any combination thereof.

Clause 17: The user device of any of clauses 10-16, wherein the at least one processor is further configured to: receive an authentication response from the issuer server after authentication of the payment transaction, wherein the authentication of the payment transaction comprises: decrypting, by the issuer server, the second cryptogram using a second key, wherein the second key is obtained from the network server; validating, by the issuer server, the phone number associated with the user device based on payer information stored in a database associated with the issuer server; and providing, by the issuer server, the authentication response to the user device based on a result of the validation.

Clause 18: A network server, comprising: at least one processor; and a memory communicatively coupled to the at least one processor, wherein the memory stores processor instructions, which, on execution, causes the at least one processor to: receive a request for a first key from at least one of a user device and a server associated with a manufacturer of the user device; provide the first key to at least one of the user device and the server associated with the manufacturer, wherein the user device generates a first cryptogram based on at least one of a phone number associated with a Subscriber Identification Module (SIM) card in the user device and a unique identification value associated with the user device using the first key; receive a request for a second key from the server associated with the manufacturer; and provide the second key to the server associated with the manufacturer and an issuer server, wherein the server associated with the manufacturer generates a second cryptogram using the second key, further wherein the second cryptogram is validated to authenticate a payment transaction.

Clause 19: The network server of clause 18, wherein providing the first key comprises: generating the first key in real-time using one or more cryptographic techniques; and sending the first key to at least one of the user device and the server associated with the manufacturer.

Clause 20: The network server of clause 18 or 19, wherein providing the second key comprises: generating the second key in real-time using one or more cryptographic techniques; and sending the second key to the server associated with the manufacturer and the issuer server.

Disclosed herein is a computer-implemented method for authenticating a payment transaction. In some non-limiting embodiments or aspects, the method includes receiving a request for verifying a phone number associated with a Subscriber Identification Module (SIM) card in the user device from a merchant application installed in the user device. In response to receiving the request, the method includes obtaining a first key from at least one of a server associated with a manufacturer of the user device and a network server. Further, the method includes generating a first cryptogram based on at least one of the phone number and a unique identification value associated with the user device using the first key, wherein the first cryptogram is provided to the server associated with the manufacturer for verification. Upon verification of the first cryptogram, the method includes receiving a second cryptogram from the server associated with the manufacturer, wherein the merchant application provides the second cryptogram and payment transaction details to an issuer server for authentication of the payment transaction.

In some non-limiting embodiments or aspects, the present disclosure may include a user device for authenticating a payment transaction. The user device comprises at least one processor, and a memory communicatively coupled to the at least one processor, wherein the memory stores the at least one processor instructions, which, on execution, causes the at least one processor to receive a request for verifying a phone number associated with a Subscriber Identification Module (SIM) card in the user device from a merchant application installed in the user device. In response to receiving the request, the at least one processor is configured to obtain a first key from at least one of a server associated with a manufacturer of the user device and a network server. Further, the at least one processor is configured to generate a first cryptogram based on at least one of the phone number and a unique identification value associated with the user device using the first key, wherein the first cryptogram is provided to the server associated with the manufacturer for verification. Upon verification of the first cryptogram, the at least one processor is configured to receive a second cryptogram from the server associated with the manufacturer, wherein the merchant application provides the second cryptogram and payment transaction details to an issuer server for authentication of the payment transaction.

In some non-limiting embodiments or aspects, the present disclosure may include a network server. The network server comprises at least one processor and a memory communicatively coupled to the at least one processor, wherein the memory stores the at least one processor instructions, which, on execution, causes the at least one processor to receive a request for a first key from at least one of a user device and a server associated with a manufacturer of the user device.

Further, the at least one processor is configured to provide the first key to at least one of the user device and the server associated with the manufacturer, wherein the user device generates a first cryptogram based on at least one of a phone number associated with a Subscriber Identification Module (SIM) card in the user device and a unique identification value associated with the user device using the first key. Furthermore, the at least one processor is configured to receive a request for a second key from the server associated with the manufacturer. Thereafter, the at least one processor is configured to provide the second key to the server associated with the manufacturer and an issuer server, wherein the server associated with the manufacturer generates a second cryptogram using the second key, further wherein the second cryptogram is validated to authenticate a payment transaction.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristics of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4D is an exemplary user device sending a first cryptogram for verification to a first server, in accordance with some non-limiting embodiments or aspects of the present disclosure;

FIG. 4E is an exemplary user device receiving a second cryptogram from the first server after the verification of the first cryptogram, in accordance with some non-limiting embodiments or aspects of the present disclosure;

Figure 1:
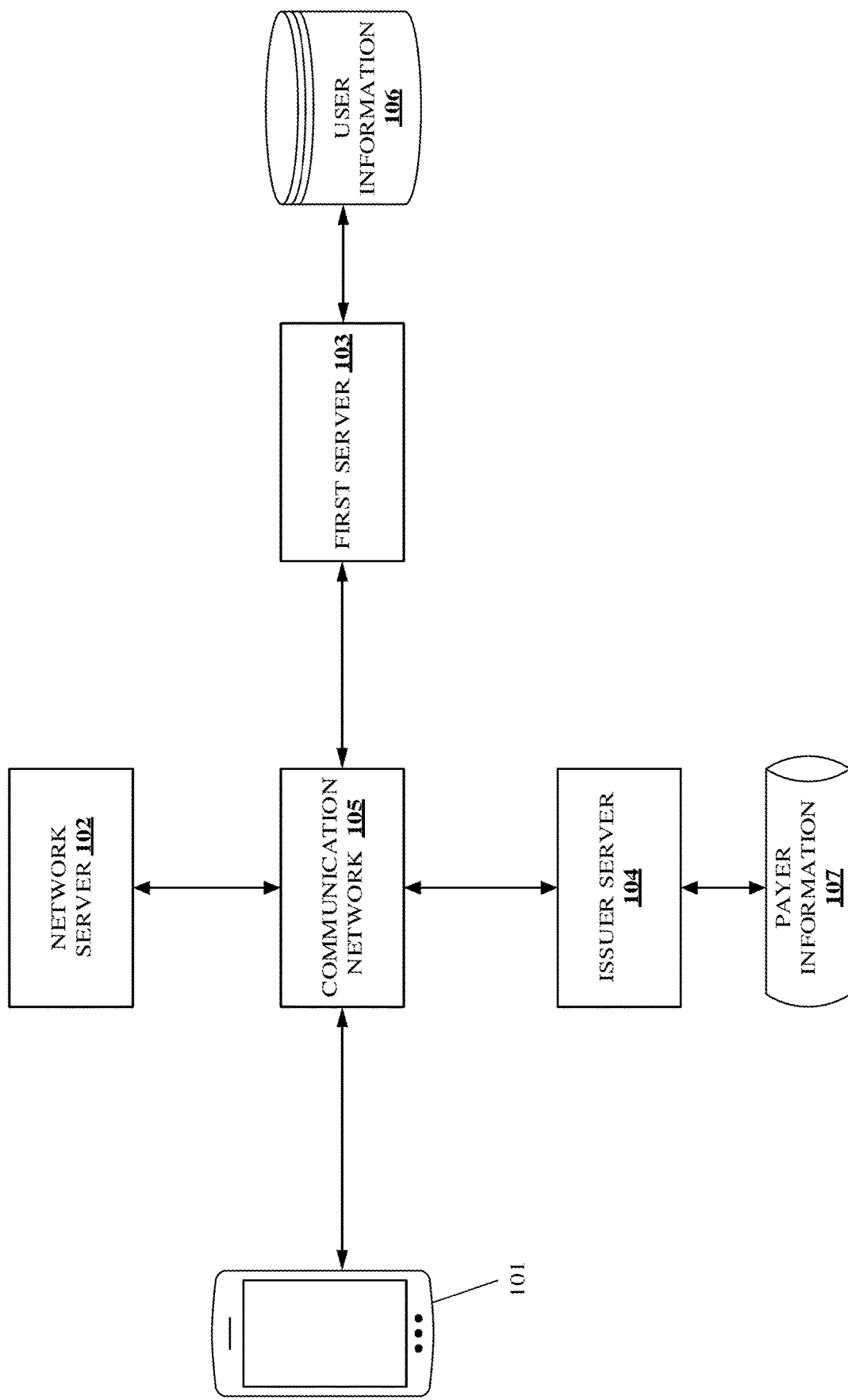
FIG. 1 is an exemplary environment for authenticating a payment transaction, in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the term "exemplary" is used herein to mean "serving as an example, instance, or illustration." Any embodiment, aspect, or implementation of the present subject matter described herein as "exemplary" is not necessarily to be construed as preferred or advantageous over other embodiments.

In the following detailed description of non-limiting embodiments or aspects of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion such that a setup, device, or method that comprises a list of components or steps does not include only those components or steps but may include other components or steps not expressly listed or inherent to such setup, device, or method. In other words, one or more elements in a system or apparatus proceeded by "comprises . . . a" do not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" do not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/feature. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

FIG. 1 shows an exemplary environment for authenticating a payment transaction using a user device (101), in accordance with some non-limiting embodiments or aspects of the present disclosure.

In some non-limiting embodiments or aspects, a user may use the user device (101) for paying a transaction amount to a merchant via a merchant application installed in the user device (101). For example, the user device (101) may be a smartphone, a tablet computer, and the like. Further, the merchant application may include applications allowing the user to purchase one or more goods (such as groceries, apparels, electronic appliances, electronic devices, and the like), one or more services (such as news subscriptions, music subscriptions, e-books, and the like), and the like. The merchant may include at least one of an individual, an organization, and the like, which accepts a transaction amount in exchange for providing goods and/or services. The user may select one of a payment card from a plurality of payment instruments stored in the merchant application for paying the transaction amount to the merchant.

The plurality of payment instruments stored in the merchant application are referred to as "card-on-file". The selection of the payment card is indicative of initiating a payment transaction in the user device. Further, upon the user selecting one of the payment cards, the merchant application sends a request to the user device (101) for verifying a phone number associated with a Subscriber Identification Module (SIM) card in the user device (101). Upon receiving the request from the merchant application, the user device (101) obtains a first key from at least one of a server associated with a manufacturer of the user device (101) and a network server (102). The manufacturer may include at least one of an entity producing the user device (101) or one or more components of the user device (101), an entity providing one or more services (for example, a software application required to operate the user device (101)) in the user device such as operating systems, device drivers, and the like. The first key may be an alphanumeric string used to determine an output of one or more encryption techniques and one or more decryption techniques.

The server associated with the manufacturer of the user device (101) is denoted as a first server (103) in FIG. 1. The phrases "server associated with the manufacturer" and the "first server (103)" are used interchangeably in the present disclosure. The network server (102) is an entity for assisting in processing the payment transaction between an issuer financial institution associated with the user and an acquirer financial institution associated with the merchant based on the authentication and authorization of the payment transaction.

In some non-limiting embodiments or aspects, after the first key is obtained from the network server (102) or the first server (103), the user device (101) generates a first cryptogram. The first cryptogram is generated based on at least one of the phone number and a unique identification value associated with the user device (101) using the first key as an input to the one or more encryption techniques. The one or more encryption techniques may include one of symmetric key based encryption techniques, asymmetric key based encryption techniques, a digital signature based cryptographic techniques, cryptographic hash functions, JSON Web Encryption (JWE), JSON Web Signature (JWS), and/or any combinations thereof. The first cryptogram is an encrypted text including at least one of a cipher text, a digital signature, a cryptographic hash, and the like. Further, the unique identification value associated with the user device (101) is indicative of an alphanumeric key used to uniquely identify the user device (101). The unique identification value may include an International Mobile Equipment Identity (IMEI) number of the user device (101), a medium access control (MAC) address, and the like.

In some non-limiting embodiments or aspects, the first cryptogram generated by the user device (101) is provided to the server associated with the manufacturer for verification. The first server (103) triggers the verification of the first cryptogram by decrypting the first cryptogram using the first key and one or more decryption techniques corresponding to one or more encryption techniques used by the user device (101). The one or more decryption techniques may include one of symmetric key based decryption techniques, asymmetric key based decryption techniques, a digital signature based cryptographic techniques, cryptographic hash functions, JWE, JWS, and/or any combination thereof. Further, the first server (103) validates the phone number and the unique identification value associated with the user device (101) based on user information (106) (such as the phone number and the unique identification value) stored in a database. The database corresponds to the server associated with the manufacturer of the user device (101).

In some non-limiting embodiments or aspects, after validating the phone number and the unique identification value, the first server (103) sends a second cryptogram to the user device (101). The first server (103) generates the second cryptogram based on the at least one of the phone number and the unique identification value associated with the user device (101) using a second key. In some non-limiting embodiments or aspects, the second cryptogram may include the phone number of the user device (101) corresponding to the unique identification value. The second key may be an alphanumeric string used to determine an output of a cryptographic technique such as the one or more encryption techniques. The second cryptogram is generated using the cryptographic technique including one of symmetric key based encryption techniques, asymmetric key based encryption techniques, digital signature based cryptographic techniques, cryptographic hash functions, JWE, JWS, and/or any combination thereof. The second cryptogram is the encrypted text including at least one of the cipher text, the digital signature, the cryptographic hash, and the like. Further, the first server (103) obtains the second key required to generate the second cryptogram from the network server (102).

In some non-limiting embodiments or aspects, the user device (101) receives the second cryptogram from the server associated with the manufacturer after the verification of the first cryptogram. The merchant application installed in the user device (101) provides the second cryptogram and payment transaction details to an issuer server (104) via the network server (102) for authentication of the payment transaction. For example, the payment transaction details may include the payment card details, a payment transaction amount, issuer details, acquirer details, and the like. Further, the issuer server (104) decrypts the second cryptogram using a second key. The issuer server (104) obtains the second key from the network server (102). After decrypting the second cryptogram, the issuer server (104) validates the phone number associated with the user device (101) received in the second cryptogram based on payer information (107) stored in a database associated with the issuer server (104). The payer information (107) may include the phone number of the user and the corresponding payment card information. The issuer server (104) provides an authentication response to the user device (101) based on a result of the validation and the user device (101) receives the authentication response from the issuer server (104).

In some non-limiting embodiments or aspects, the user device (101), the network server (102), the issuer server (104), and the server associated with the manufacturer (e.g., first server (103)) are interconnected via a communication network (105) for communicating with each other. Further, the communication network (105) may include, for example, a direct interconnection, e-commerce network, a peer to peer (P2P) network, local area network (LAN), wide area network (WAN), wireless network (e.g., using Wireless Application Protocol), the Internet, Wi-Fi®, cellular network, wired network, short-range communication, and the like.

Figure 2A:
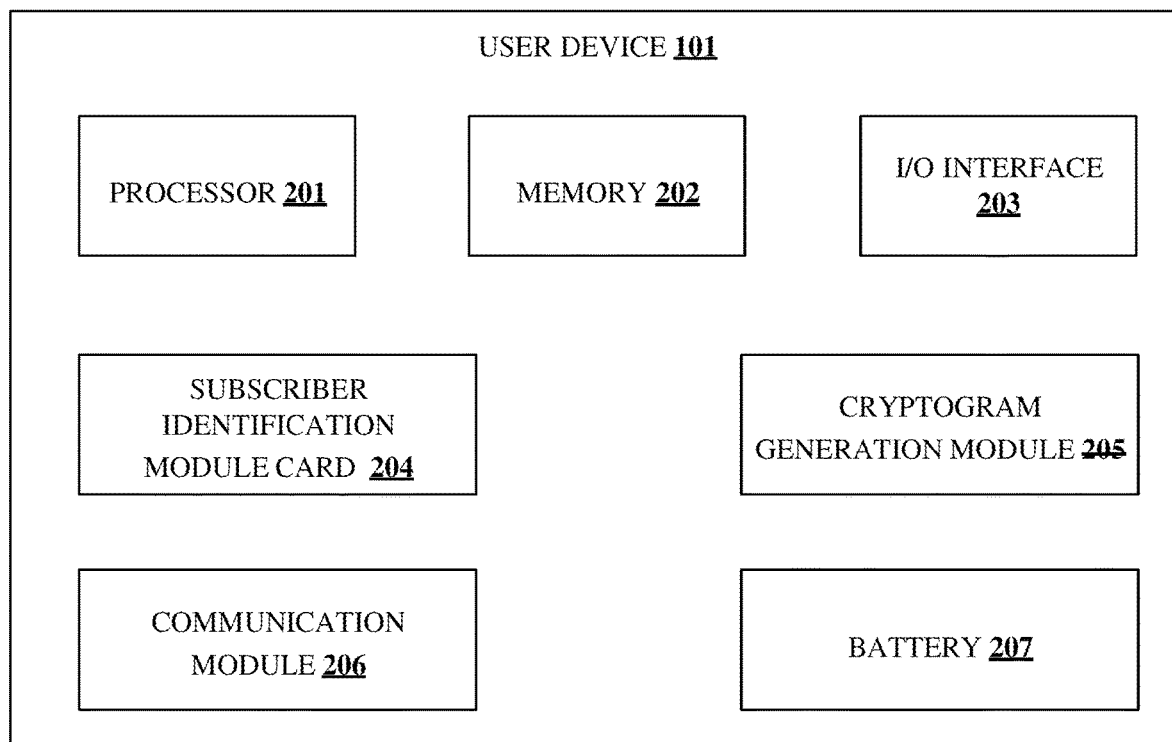
FIG. 2A is a simplified block diagram of a user device, in accordance with some non-limiting embodiments or aspects of the present disclosure.

FIG. 2A shows a simplified block diagram of the user device (101), in accordance with some non-limiting embodiments or aspects of the present disclosure.

In some non-limiting embodiments or aspects, the user device (101) may include at least one Central Processing Unit ("CPU" or "processor") (201) and a memory (202) storing instructions executable by the at least one processor (201). The processor (201) may comprise at least one data processor for executing program components for executing user- or system-generated requests. The memory (202) is communicatively coupled to the processor (201). The user device (101) further comprises an Input/Output (I/O) interface (203). The I/O interface (203) is coupled with the processor (201) through which an input signal or/and an output signal is communicated. In some non-limiting embodiments or aspects, the merchant application, a cryptogram generation module (205), and a communication module (206) may be present inside the memory (202). In another embodiment, the merchant application, the cryptogram generation module (205), and the communication module (206) may be present outside the memory (202). Further, the user device (101) includes a subscriber identification module (SIM) card (204) communicatively connected to the processor (201). Furthermore, the user device (101) includes a battery (207) for providing power required for the operation of the user device (101). In some non-limiting embodiments or aspects, the SIM card (204)

includes information such as a SIM number and the phone number associated with the SIM card (204).

In some non-limiting embodiments or aspects, the cryptogram generation module (205) is used to generate the first cryptogram based on at least one of the phone number and the unique identification value associated with the user device (101) using the first key. The cryptogram generation module (205) obtains the phone number from the SIM card (204) in the user device (101), the unique identification value from the memory (202) in the user device (101) and the first key from at least one of the server associated with the manufacturer or the memory (202) in the user device (101). In some non-limiting embodiments or aspects, the first key may be generated by the server associated with the manufacturer and stored in the memory (202) associated with the user device (101). Further, the cryptogram generation module (205) generates the first cryptogram using the one or more encryption techniques. The one or more encryption techniques may include one of symmetric key based encryption techniques, asymmetric key based encryption techniques, a digital signature based cryptographic techniques, cryptographic hash functions, JWE, JWS, and/or any combination thereof.

In some non-limiting embodiments or aspects, the communication module (206) is used for communicating with the server associated with the manufacturer (e.g., first server (103)) via the communication network (105) for sending a request for the first key and receiving the first key from the first server (103). Further, the communication module (206) is used for communicating with the network server (102) via the communication network (105) for sending a request for the first key to the network server (102) directly or via the first server (103) and receiving the first key from the network server (102) directly or via the first server (103). Furthermore, the communication module (206) is used for communicating with the issuer server (104) via the communication network (105) for providing the second cryptogram and the payment transaction details to the issuer server (104) for authentication of the payment transaction and receiving an authentication response from the issuer server (104) after the authentication of the payment transaction.

Figure 2B:
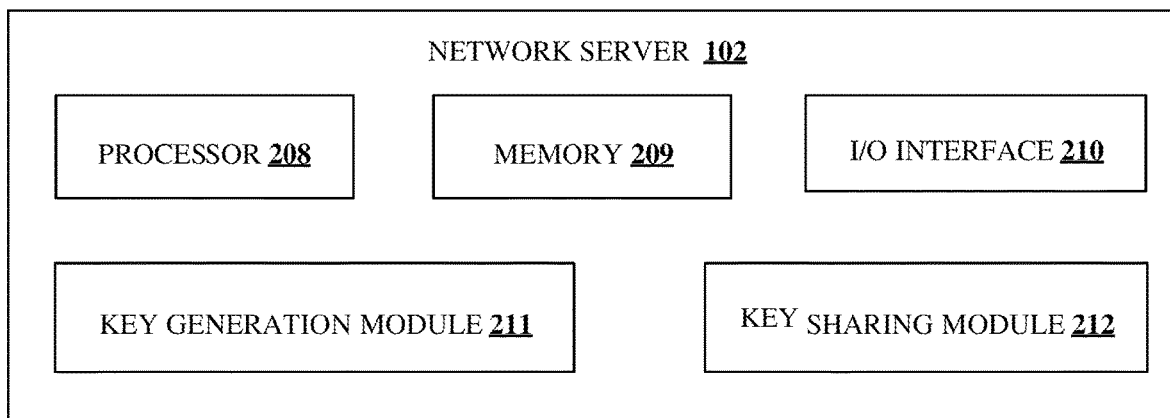
FIG. 2B is a simplified block diagram of a network server for assisting in authentication of a payment transaction, in accordance with embodiments of the present disclosure.

FIG. 2B shows a simplified block diagram of the network server (102), in accordance with some non-limiting embodiments or aspects of the present disclosure.

In some non-limiting embodiments or aspects, the network server (102) may include at least one Central Processing Unit ("CPU" or "processor") (208) and a memory (209) storing instructions executable by the at least one processor (208). The processor (208) may comprise at least one data processor for executing program components for executing user or system-generated requests. The memory (209) is communicatively coupled to the processor (208). The network server (102) further comprises an Input/Output (I/O) interface (210). The I/O interface (210) is coupled with the processor (208) through which an input signal or/and an output signal is communicated.

In some non-limiting embodiments or aspects, a key generation module (211) is used to generate the first key and the second key. The first key is generated in real-time using one or more cryptographic techniques after receiving the request from the user device (101). The first key is used to generate the first cryptogram by the user device (101). The first key is also used to verify the first cryptogram by the first server (103). The second key is generated in real-time using the one or more cryptographic techniques after receiving the request from the first server (103). The second key is used to generate the second cryptogram by the first server (103). The second is also used to validate the second cryptogram by the issuer server (104). In another embodiment, the first key and the second key may be generated using one or more cryptographic techniques periodically, such as every minute, 5 minutes, 15 minutes, and the like and stored in the memory (209). If a request from the user device (101) or the first server (103) is received, then the periodically generated first key and the second key are used to generate the first cryptogram and the second cryptogram, respectively.

In some non-limiting embodiments or aspects, a key sharing module (212) is used to provide the generated first key to the user device (101) and the server associated with the manufacturer (e.g., first server (103)) of the user device (101). Further, the key sharing module (212) is used to provide the generated second key to the first server (103) and the issuer server (104). In some non-limiting embodiments or aspects, the key generation module (211) and the key sharing module (212) may be combined into a single module.

Figure 3:
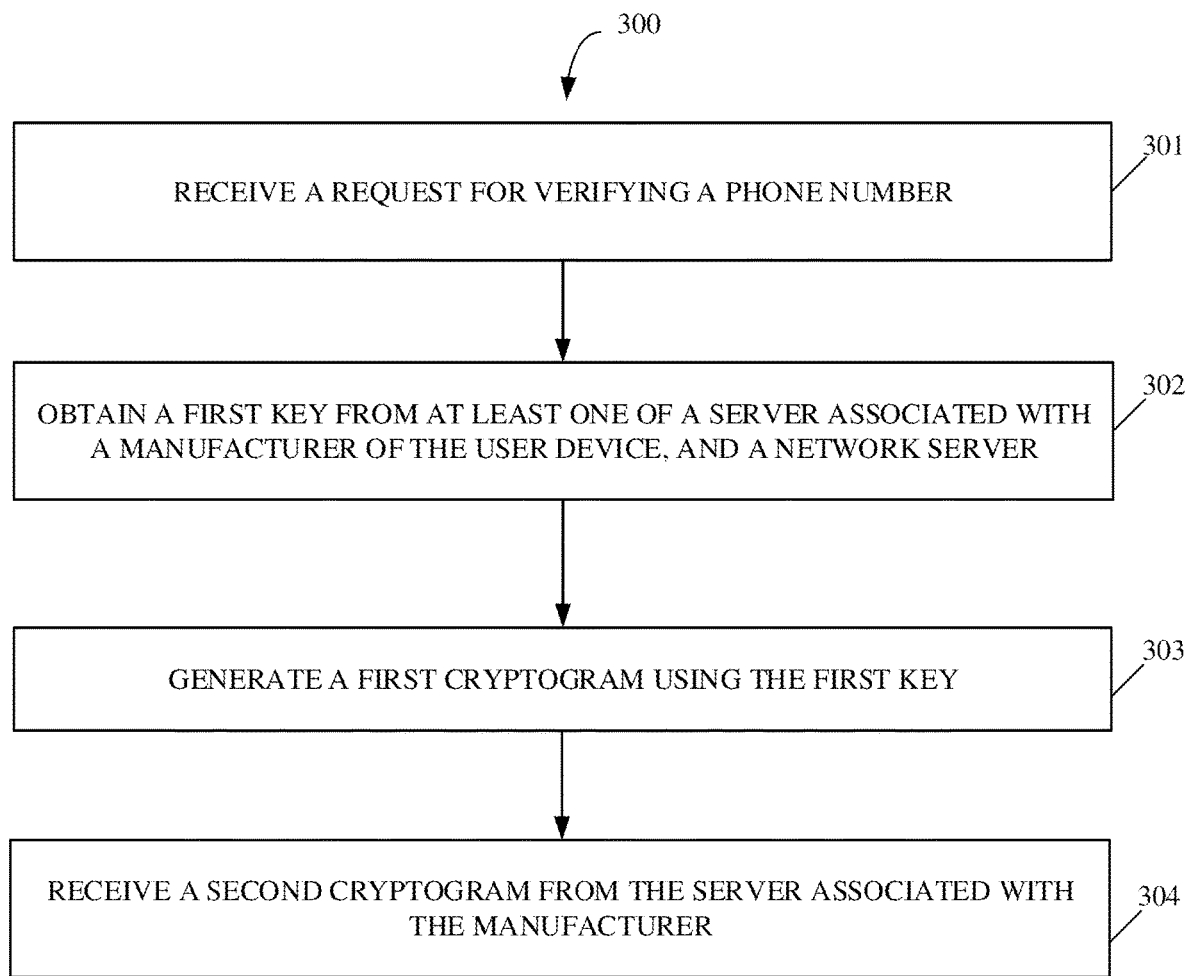
FIG. 3 is a flow chart illustrating method steps for authenticating a payment transaction, in accordance with some non-limiting embodiments or aspects of the present disclosure.

FIG. 3 shows a flow chart illustrating method steps for authenticating a payment transaction, in accordance with some non-limiting embodiments or aspects of the present disclosure.

The order in which the method (300) is described is not intended to be construed as a limitation, and any number of the described method blocks may be combined in any order to implement the method. Additionally, individual blocks may be deleted from the method without departing from the spirit and scope of the subject matter described herein. Furthermore, the method may be implemented in any suitable hardware, software, firmware, and/or any combination thereof.

At step 301, the user device (101) receives a request for verifying a phone number associated with a SIM card in the user device (101) from a merchant application installed in the user device (101).

Figure 4A:
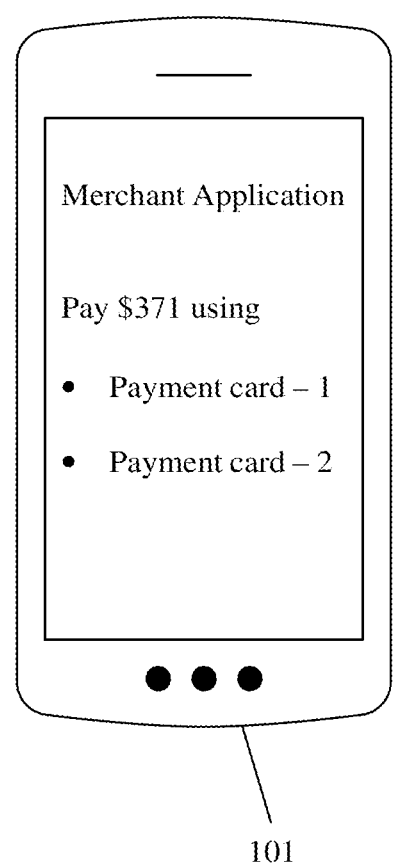
FIG. 4A is an exemplary merchant application with a plurality of payment instruments for initiating a payment to the merchant, in accordance with some non-limiting embodiments or aspects of the present disclosure.

In some non-limiting embodiments or aspects, the user may use a user device (101) for paying the transaction amount to the merchant via the merchant application installed in the user device (101). The merchant application may include applications allowing the user to purchase one or more goods (such as grocery, apparels, electronic appliances, electronic devices, and the like), one or more services (such as news subscriptions, music subscriptions, e-books, and the like), and the like. Further, the user may select one payment card from the plurality of payment instruments stored in the merchant application for paying the transaction amount to the merchant as shown in FIG. 4A. The plurality of payment instruments stored in the merchant application are referred to as "card-on-file". The selection of the payment card is indicative of initiating a payment transaction in the user device.

In some non-limiting embodiments or aspects, for paying the transaction amount to the merchant, the issuer server (104) associated with the payment card needs to authenticate the user by verifying the phone number associated with the SIM card (204) in the user device (101) with the payer information (107) stored in the database associated with the issuer server (104). Further, upon the user selecting one of the payment cards, the merchant application sends the request to the user device (101) for the verifying the phone number associated with the SIM card (204) in the user device (101).

Referring back to FIG. 3, at step 302, in response to receiving the request, the user device (101) obtains a first key from at least one of a server associated with a manufacturer of the user device (101) and a network server (102).

In some non-limiting embodiments or aspects, the first key may be the alphanumeric string used to determine the output of the one or more encryption techniques and the one or more decryption techniques. The first key is generated using the one or more cryptographic techniques, such as pseudo random number generators, Diffie-Hellman technique, key management interoperability protocol, software tokens, and the like. In some non-limiting embodiments or aspects, the first key may comprise two sub-keys where the first sub-key is provided to the user device (101) and the second sub-key is provided to the first server (103). In another embodiment, the first key may comprise a single key or a single sub-key provided to both user device (101) and the first server (103).

Figure 4B:
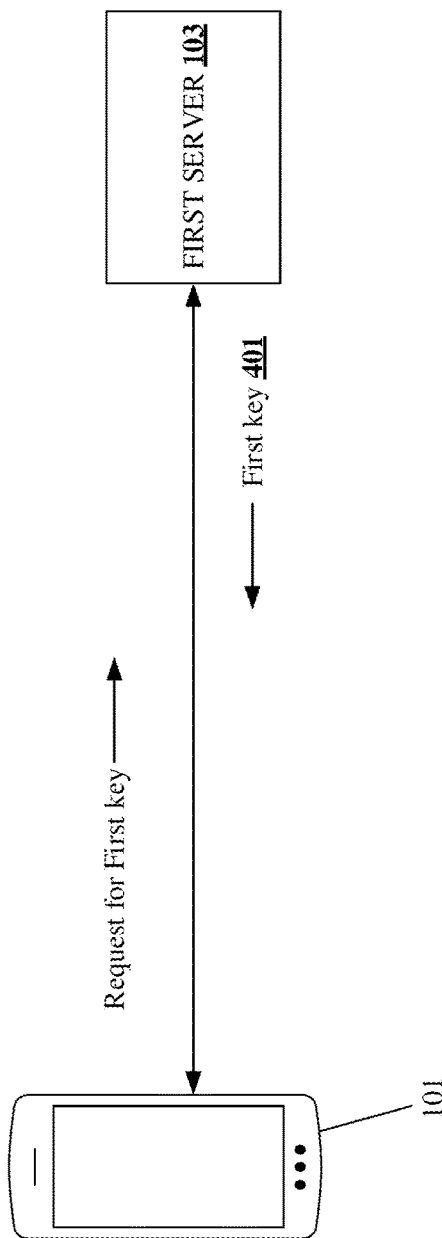
FIG. 4B is an exemplary user device requesting and obtaining a first key from the first server, in accordance with some non-limiting embodiments or aspects of the present disclosure.

In some non-limiting embodiments or aspects, the user device (101) sends the request for a first key (401) to the server associated with the manufacturer (e.g., first server (103) of the user device (101)), as shown in FIG. 4B. The server associated with the manufacturer generates the first key (401) in real-time using one or more cryptographic techniques. Further, the user device (101) receives the first key (401) from the server associated with the manufacturer as shown in FIG. 4B.

In some non-limiting embodiments or aspects, the user device (101) fetches the first key (401) from the memory (202) associated with the user device (101). The first key (401) stored in the memory (202) was generated by the server associated with the manufacturer and stored in the memory (202) during manufacturing of the user device.

Figure 4C:
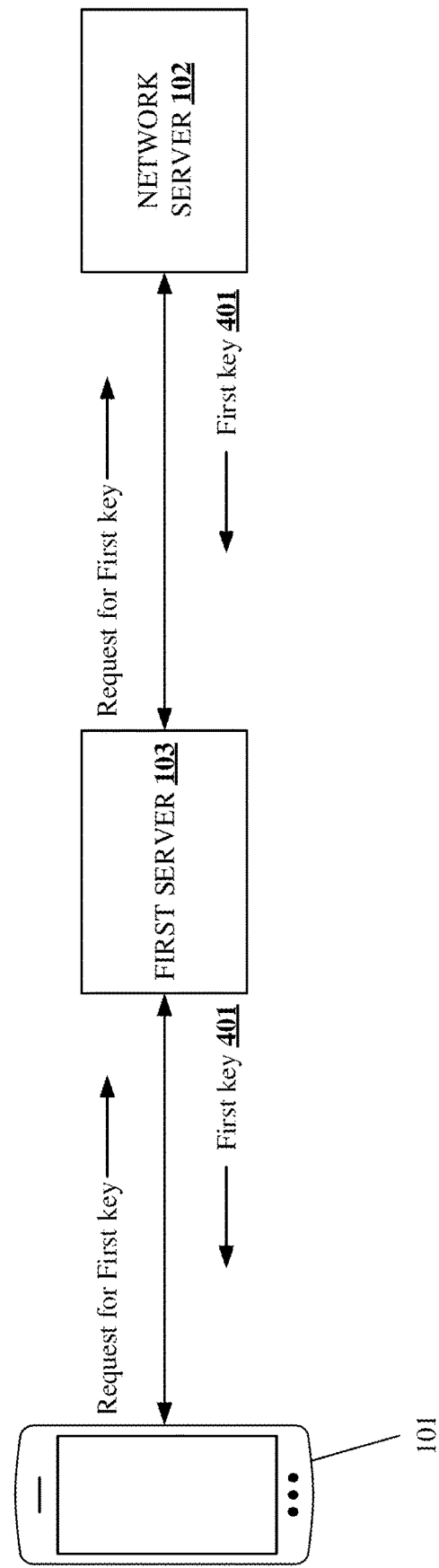
FIG. 4C is an exemplary user device requesting and obtaining a first key from the network server via the first server, in accordance with some non-limiting embodiments or aspects of the present disclosure.

In some non-limiting embodiments or aspects, the user device (101) obtains the first key (401) from the network server (102) by sending a request for the first key (401) to the network server (102) directly or via the server associated with the manufacturer of the user device (101) as shown in FIG. 4C. The network server (102) generates the first key (401) in real-time using one or more cryptographic techniques. Further, the user device (101) receives the first key (401) from the network server (102) directly or via the server associated with the manufacturer of the user device (101) as shown in FIG. 4C. When the user device (101) obtains the first key (401) directly from the network server (102), the first key (401) is also provided to the first server (103) by the network server (102).

Referring back to FIG. 3, at step 303, the user device (101) generates a first cryptogram based on at least one of the phone number and a unique identification value associated with the user device (101) using the first key (401), wherein the first cryptogram is provided to the server associated with the manufacturer for verification.

In some non-limiting embodiments or aspects, the user device (101) generates the first cryptogram based on one or more encryption techniques using at least one of the phone number and the unique identification value associated with the user device (101) and the first key (401). The unique identification value includes at least an International Mobile Equipment Identity (IMEI) number, the MAC address associated with the user device (101), and the like. The one or more encryption techniques may include one of symmetric key based encryption techniques, asymmetric key based encryption techniques, a digital signature based cryptographic techniques, cryptographic hash functions, JWE, JWS, and/or any combination thereof. The first cryptogram is the encrypted text including at least one of the cipher text, the digital signature, the cryptographic hash, and the like. In some non-limiting embodiments or aspects, the user device (101) may provide a safety attestation certificate along with the first cryptogram to the first server (103). The safety attestation certificate is indicative of the integrity of the user device (101).

In some non-limiting embodiments or aspects, after the generation of the first cryptogram (402), the user device (101) provides the first cryptogram (402) to the server associated with the manufacturer for verification as shown in FIG. 4D. Further, the server associated with the manufacturer decrypts the first cryptogram (402) using the first key (401) and one or more decryption techniques corresponding to one or more encryption techniques used to generate the first cryptogram (402). The one or more decryption techniques may include one of symmetric key based decryption techniques, asymmetric key based encryption techniques, digital signature based cryptographic techniques, cryptographic hash functions, JWE, JWS, and/or any combination thereof. Further, the first server (103) validates the phone number and the unique identification value associated with the user device (101) based on user information (106) stored in a database corresponding to the server associated with the manufacturer of the user device (101). In some non-limiting embodiments or aspects, first server (103) validates the phone number and the unique identification value by generating a new cryptogram using the user information (106) (such as the phone number and the unique identification value) stored in a database corresponding to the server and the first key (401). Further, in comparing the first cryptogram (402) with the new cryptogram, if the first cryptogram (402) and the new cryptogram are same, then the verification is successful. Alternatively, if the first cryptogram (402) and the new cryptogram are different, then the verification is unsuccessful. The successful verification is indicative of the association of the SIM card (204) in the user device (101) and the device integrity.

Referring back to FIG. 3, at step 304, upon verification of the first cryptogram (402), the user device (101) receives a second cryptogram from the server associated with the manufacturer, wherein the merchant application provides the second cryptogram and the payment transaction details to an issuer server (104) for authentication of the payment transaction.

In some non-limiting embodiments or aspects, the second cryptogram (403) received by the user device (101) after the verification of the first cryptogram (402), as shown in FIG. 4E, from the server associated with the manufacturer is generated by the server associated with the manufacturer using a second key based on at least one of the phone number and the unique identification value associated with the user device (101). The phone number and the unique identification value are stored as the user information (106) in the database. In some non-limiting embodiments or aspects, the second cryptogram (403) may include the phone number of the user. The second cryptogram is the encrypted text including at least one of the cipher text, the digital signature, the cryptographic hash, and the like. The second cryptogram is generated using the cryptographic technique including one of symmetric key based encryption techniques, asymmetric key based encryption techniques, a digital signature based cryptographic techniques, cryptographic hash functions, JWE, JWS, and/or any combination thereof.

In some non-limiting embodiments or aspects, the first server (103) obtains the second key from the network server (102). Upon successful verification of the first cryptogram (402), the first server (103) sends a request to the network server (102) for obtaining the second key. The network server (102) generates the second key, in real-time, using the one or more cryptographic techniques, such as pseudo random number generators, Diffie-Hellman technique, key management interoperability protocol, software tokens, and the like. In some non-limiting embodiments or aspects, the second key may comprise two sub-keys where the first sub-key is provided to the first server (103) and the second sub-key is provided to the issuer server (104). In another embodiment, the second key may comprise a single key or a single sub-key and is provided to both the first server (103) and the issuer server (104). The first server (103) generates the second cryptogram (403) using the user information (106) and the second key and provides the second cryptogram (403) to the user device (101) as shown in FIG. 4E.

Figure 4F:
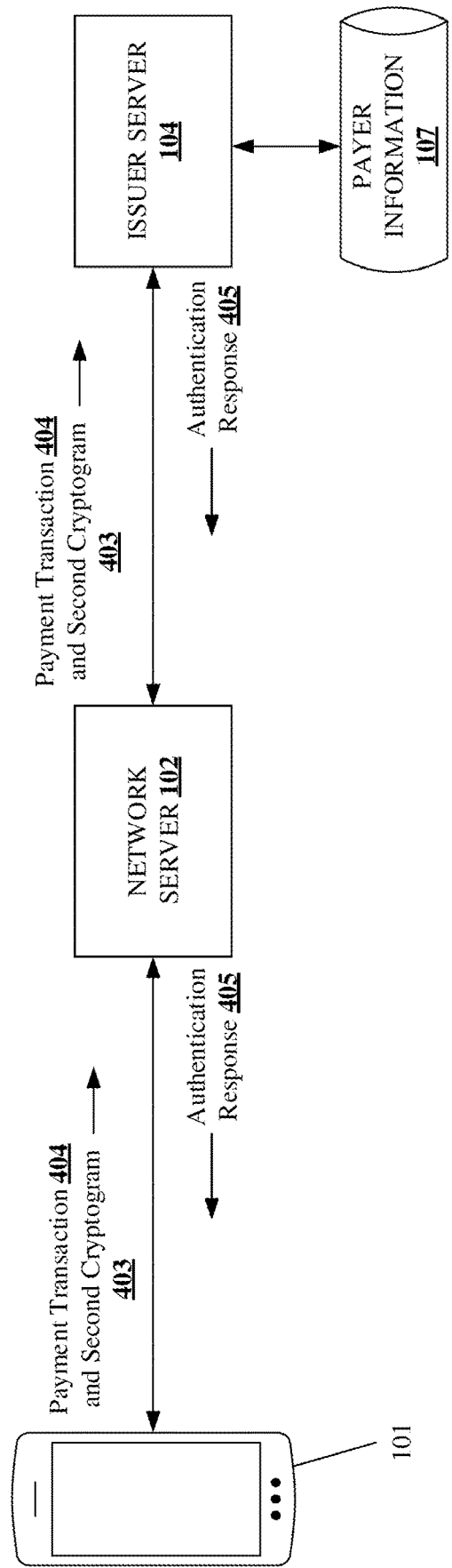
FIG. 4F is an exemplary user device sending a second cryptogram and a payment transaction for authentication to an issuer server and receiving an authentication response from the issuer server, in accordance with some non-limiting embodiments or aspects of the present disclosure.

In some non-limiting embodiments or aspects, the user device (101) provides the second cryptogram (403) received from the first server (103) and a payment transaction (404) comprising the payment transaction details to the issuer server (104) by sending the second cryptogram (403) and the payment transaction (404) to the issuer server (104) via at least one of the network server (102), a direct integration with the issuer server (104), an Access Control Server (ACS), and Merchant Plug-In (MPI) provider as shown in FIG. 4F. For example, the payment transaction details may include the payment card details, a payment transaction amount, issuer details, acquirer details, and the like. The user device (101) provides the second cryptogram (403) and the payment transaction (404) to the issuer server (104) for authentication of the payment transaction (404) and the user.

In some non-limiting embodiments or aspects, the issuer server (104) decrypts the second cryptogram (403) using a second key. The second key is obtained from the network server (102). In some non-limiting embodiments or aspects, the issuer server (104) may request the second key from the network server (102). In another embodiment, the network server (102) may provide the second key while providing the second key to the first server (103). Upon decrypting the second cryptogram (403), the issuer server (104) obtains the phone number of the user from the second cryptogram (403). Further, the issuer server (104) validates the phone number associated with the user device (101) based on payer information (107) stored in a database associated with the issuer server (104). The issuer server (104) validates the phone number received in the second cryptogram (403) by comparing the phone number with the payer information (107). The payer information (107) includes the identity of the user, such as a name, birthdate, and the like, and the phone number of the user. The validation is successful when the phone number received in the second cryptogram (403) matches with the payer information (107). The validation is unsuccessful when the phone number received in the second cryptogram (403) does not match with the payer information (107). If the validation is successful, then the payment transaction (404) is authenticated by the issuer server (104). If the validation is unsuccessful, then the payment transaction (404) is not authenticated by the issuer server (104). Furthermore, the issuer server (104) provides an authentication response (405) to the user device (101) based on a result of the validation as shown in FIG. 4F. The authentication response (405) includes at least one of a successful message or an unsuccessful message based on the result of the validation.

In some non-limiting embodiments or aspects, the user device (101) receives the authentication response (405) from the issuer server (104) indicating one of the successful authentication or the unsuccessful authentication of the payment transaction (404). The successful authentication of the payment transaction (404) indicates the payment transaction (404) is initiated by an authorized user. Further, the merchant application provides the authentication response (405) to the network server (102) for authorization of the payment transaction (404).

The method of authenticating the payment transaction (404) includes authenticating the user as the authorized user for the payment transaction (404) by decrypting the second cryptogram (403) validating the phone number with the payer information (107) stored in the database associated with the issuer server (104). The verification of the first cryptogram (402) by the first server (103) confirms the integrity of the user device (101) and confirms the association of the phone number and SIM card (204) with the user device (101). The second cryptogram (403) generated by the first server (103) using the second key is used for authenticating the user and the payment transaction (404). The validation of the second cryptogram (403) by the issuer server (104) confirms the generation of the second cryptogram (403) was done by the first server (103) alone. Further, the phone number of the user received in the second cryptogram (403) matching with the payer information (107) indicates the user is the authorized user and payment transaction (404) is a valid transaction between the user and the merchant. The method of authenticating the payment transaction (404) eliminates the need of a text message based one-time password for authenticating the user. Further, the method of authenticating the payment transaction (404) to keep the phone number secure allows the access to view the phone number only by the first server (103) and the issuer server (104).

Figure 5:
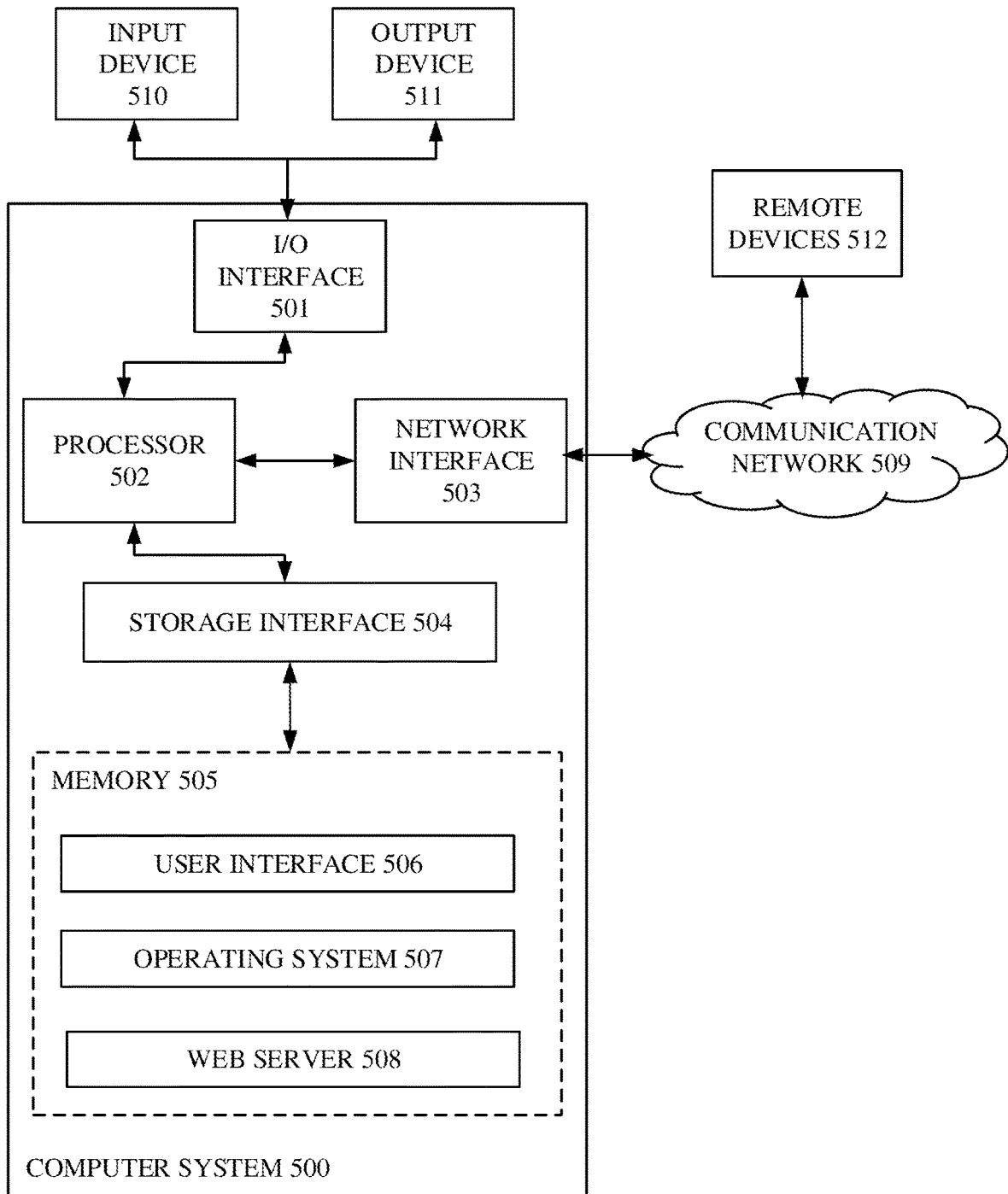
FIG. 5 is an exemplary computer system for authenticating a payment transaction, in accordance with some non-limiting embodiments or aspects of the present disclosure.

FIG. 5 illustrates a block diagram of an exemplary computer system (500) for implementing embodiments consistent with the present disclosure. In some non-limiting embodiments or aspects, the computer system (500) may be used to implement the method for authenticating the payment transaction (404). The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via an I/O interface (501). The I/O interface (501) may employ communication protocols/methods such as, without limitation, audio, analog, digital, monoaural, RCA, stereo, IEEE-(139)4, serial bus, universal serial bus (USB), infrared, PS/2, BNC, coaxial, component, composite, digital visual interface (DVI), high-definition multimedia interface (HDMI), RF antennas, S-Video, VGA, IEEE 802.1 n /b/g/n/x, Bluetooth®, cellular (e.g., code-division multiple access (CDMA), high-speed packet access (HSPA+), global system for mobile communications (GSM), long-term evolution (LTE), WiMax®, or the like), etc.

Using the I/O interface (501), the computer system (500) may communicate with one or more I/O devices. For example, an input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some non-limiting embodiments or aspects, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi®, etc. Using the network interface (503) and the communication network (509), the computer system (500) may communicate with the one or more service operators.

In some non-limiting embodiments or aspects, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-(139)4, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, a user interface (506), an operating system (507), a web server (508), etc. In some non-limiting embodiments or aspects, the computer system (500) may store user/application data (506), such as the data, variables, records, etc., as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE® ANDROID™, BLACKBERRY® OS, or the like.

In some non-limiting embodiments or aspects, the computer system (500) may implement a web browser (not shown in FIG. 5) stored program component. The web browser (not shown in FIG. 5) may be a hypertext viewing application, such as MICROSOFT® INTERNET EXPLORER®, GOOGLE® CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc. In some non-limiting embodiments or aspects, the computer system (500) may implement a mail server (not shown in FIG. 5) stored program component. The mail server may be an Internet mail server such as MICROSOFT® Exchange, or the like. The mail server (not shown in the Figure) may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some non-limiting embodiments or aspects, the computer system (500) may implement a mail client (not shown in FIG. 5) stored program component. The mail client (not shown in FIG. 5) may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In some non-limiting embodiments or aspects, the computer system (500) may receive at least one of the request for the first key (401), the request for the second key, the second cryptogram (403), the payment transaction (404), and the authentication response (405) from remote devices (512), such as the user device (101), the first server (103), and the issuer server (104), via the communication network (509).

The described operations may be implemented as a method, system, or article of manufacture using standard programming and/or engineering techniques to produce software, firmware, hardware, or any combination thereof. The described operations may be implemented as code maintained in a "non-transitory computer-readable medium", where a processor may read and execute the code from the computer-readable medium. The processor is at least one of a microprocessor and a processor capable of processing and executing the queries. A non-transitory computer-readable medium may include media, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, and the like), and the like. Further, non-transitory computer-readable media may include all computer-readable media except for a transitory. The code implementing the described operations may further be implemented in hardware logic (e.g., an integrated circuit chip, Programmable Gate Array (PGA), Application ASIC, and the like).

An "article of manufacture" includes non-transitory computer-readable medium and/or hardware logic in which code may be implemented. A device in which the code implementing the described embodiments of operations are encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "some non-limiting embodiments or aspects", "embodiment", "embodiments", "the embodiment", "the embodiments", "one or more embodiments", "some-non-limiting embodiments or aspects", and "some non-limiting embodiments or aspects" mean "one or more (but not all) embodiments of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 3 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

A description of some non-limiting embodiments or aspects with several components in communication with each other does not imply that all such components are required. On the contrary, a variety of optional components is described to illustrate the wide variety of possible embodiments of the disclosure.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method, comprising:
receiving, by at least one server, a request for a key from a user device in response to the user device receiving a request for verifying a phone number associated with a Subscriber Identification Module (SIM) card in the user device from a merchant application of the user device, the request for verifying the phone number being received by the user device in response to a selection of a payment card of a plurality of payment cards stored in the merchant application for a payment transaction between a user of the user device and a merchant associated with the merchant application;
communicating, by the at least one server, the key to the user device in response to receiving the request for the key, wherein communicating the key comprises one of:
communicating a first key to the user device, the first key generated by the at least one server in real-time using one or more cryptographic techniques, wherein the key comprises the first key;
communicating a second key to the user device, the second key generated by the at least one server and stored in a memory associated with the user device during manufacturing of the user device, wherein the key comprises the second key; or
communicating the request for the key to at least one other server,
receiving a third key from the at least one other server, and communicating the third key to the user device, wherein the at least one other server generated the third key in real-time using the one or more cryptographic techniques, wherein the key comprises the third key;
receiving, by the at least one server, a first cryptogram generated based on the phone number using the key and a safety attestation certificate indicating integrity of the user device from the user device;
verifying, by the at least one server, the first cryptogram and the safety attestation certificate; and
communicating, by the at least one server, a second cryptogram to the user device, wherein the second cryptogram and payment transaction details are provided by the merchant application to an issuer server for authentication of the payment transaction.

2. The method of claim 1, wherein the first cryptogram is generated based on one or more encryption techniques using at least one of the phone number and a unique identification value associated with the user device and the first key.

3. The method of claim 1, wherein receiving the first cryptogram triggers the at least one server to decrypt the first cryptogram using the key and one or more decryption techniques corresponding to one or more encryption techniques used to generate the first cryptogram and to validate the phone number and a unique identification value associated with the user device based on user information stored in a database corresponding to the at least one server.

4. The method of claim 1, wherein the second cryptogram is generated by the at least one server using a further key based on at least one of the phone number and a unique identification value associated with the user device, wherein the further key is obtained from the at least one other server.

5. The method of claim 4, wherein the issuer server communicates an authentication response after authentication of the payment transaction, wherein the authentication of the payment transaction comprises:
decrypting, by the issuer server, the second cryptogram using the further key, wherein the further key is obtained from the network server;

validating, by the issuer server, the phone number associated with the user device based on payer information stored in a database associated with the issuer server; and communicating, by the issuer server, the authentication response based on a result of the validation.

6. The method of claim 1, wherein the second cryptogram and the payment transaction details are provided to the issuer server via at least one of the following: the at least one other server, a direct integration with the issuer server, an Access Control Server (ACS), a Merchant Plug-In (MPI) provider, or any combination thereof.

7. The computer-implemented method of claim 1, wherein a unique identification value comprises at least an International Mobile Equipment Identity (IMEI) number associated with the user device.

8. A system, comprising:
at least one processor; and
at least one non-transitory computer-readable medium comprising one or more instructions that, when executed by the at least one processor, cause the at least one processor to:
  receive a request for a key from a user device in response to the user device receiving a request for verifying a phone number associated with a Subscriber Identification Module (SIM) card in the user device from a merchant application of the user device, the request for verifying the phone number being received by the user device in response to a selection of a payment card of a plurality of payment cards stored in the merchant application for a payment transaction between a user of the user device and a merchant associated with the merchant application;
  communicate the key to the user device in response to receiving the request for the key, wherein, when communicating the key the one or more instructions cause the at least one processor to:
    communicate a first key to the user device, the first key generated in real-time using one or more cryptographic techniques, wherein the key comprises the first key;
    communicate a second key to the user device, the second key generated and stored in a memory associated with the user device during manufacturing of the user device, wherein the key comprises the second key; or
    communicate the request for the key to at least one server, receiving a third key from the at least one server, and communicating the third key to the user device, wherein the at least one server generated the third key in real-time using the one or more cryptographic techniques, wherein the key comprises the third key;
  receive a first cryptogram generated based on the phone number using the key and a safety attestation certificate indicating integrity of the user device from the user device;
  verify the first cryptogram and the safety attestation certificate; and
  communicate a second cryptogram to the user device, wherein the second cryptogram and payment transaction details are provided by the merchant application to an issuer server for authentication of the payment transaction.

9. The system of claim 8, wherein the first cryptogram is generated based on one or more encryption techniques using at least one of the phone number and a unique identification value associated with the user device and the first key.

10. The system of claim 8, wherein receiving the first cryptogram triggers decrypting of the first cryptogram using the key and one or more decryption techniques corresponding to one or more encryption techniques used to generate the first cryptogram and to validate the phone number and a unique identification value associated with the user device based on user information stored in a database.

11. The system of claim 8, wherein the second cryptogram is generated using a further key based on at least one of the phone number and a unique identification value associated with the user device, wherein the further key is obtained from the at least one server.

12. The system of claim 11, wherein the issuer server communicates an authentication response after authentication of the payment transaction, wherein, when authenticating the payment transaction, the one or more instructions cause the at least one processor to:
  decrypt the second cryptogram using the further key, wherein the further key is obtained from the network server;
  validate the phone number associated with the user device based on payer information stored in a database associated with the issuer server; and
  communicate the authentication response based on a result of the validation.

13. The system of claim 8, The method of claim 1, wherein the second cryptogram and the payment transaction details are provided to the issuer server via at least one of the following: the at least one server, a direct integration with the issuer server, an Access Control Server (ACS), a Merchant Plug-In (MPI) provider, or any combination thereof.

14. The system of claim 8, wherein a unique identification value comprises at least an International Mobile Equipment Identity (IMEI) number associated with the user device.

15. A computer program product comprising at least one non-transitory computer-readable medium comprising one or more instructions that, when executed by at least one processor, cause the at least one processor to:
  receive a request for a key from a user device in response to the user device receiving a request for verifying a phone number associated with a Subscriber Identification Module (SIM) card in the user device from a merchant application of the user device, the request for verifying the phone number being received by the user device in response to a selection of a payment card of a plurality of payment cards stored in the merchant application for a payment transaction between a user of the user device and a merchant associated with the merchant application;
  communicate the key to the user device in response to receiving the request for the key, wherein, when communicating the key the one or more instructions cause the at least one processor to:
    communicate a first key to the user device, the first key generated in real-time using one or more cryptographic techniques, wherein the key comprises the first key;
    communicate a second key to the user device, the second key generated and stored in a memory associated with the user device during manufacturing of the user device, wherein the key comprises the second key; or
    communicate the request for the key to at least one server, receiving a third key from the at least one server, and communicating the third key to the user device, wherein the at least one server generated the third key in real-time using the one or more cryptographic techniques, wherein the key comprises the third key;

receive a first cryptogram generated based on the phone number using the key and a safety attestation certificate indicating integrity of the user device from the user device;

verify the first cryptogram and the safety attestation certificate; and communicate a second cryptogram to the user device, wherein the second cryptogram and payment transaction details are provided by the merchant application to an issuer server for authentication of the payment transaction.

16. The computer program product of claim 15, wherein the first cryptogram is generated based on one or more encryption techniques using at least one of the phone number and a unique identification value associated with the user device and the first key.

17. The computer program product of claim 15, wherein receiving the first cryptogram triggers decrypting of the first cryptogram using the key and one or more decryption techniques corresponding to one or more encryption techniques used to generate the first cryptogram and to validate the phone number and a unique identification value associated with the user device based on user information stored in a database.

18. The computer program product of claim 15, wherein the second cryptogram is generated using a further key based on at least one of the phone number and a unique identification value associated with the user device, wherein the further key is obtained from the at least one server.

19. The computer program product of claim 18, wherein the issuer server communicates an authentication response after authentication of the payment transaction, wherein, when authenticating the payment transaction, the one or more instructions cause the at least one processor to:

decrypt the second cryptogram using the further key, wherein the further key is obtained from the network server;

validate the phone number associated with the user device based on payer information stored in a database associated with the issuer server; and communicate the authentication response based on a result of the validation.

20. The computer program product of claim 15, wherein the second cryptogram and the payment transaction details are provided to the issuer server via at least one of the following: the at least one server, a direct integration with the issuer server, an Access Control Server (ACS), a Merchant Plug-In (MPI) provider, or any combination thereof.

\* \* \* \* \*